April 18, 1933.  C. H. DENNIS  1,904,860

RAKE

Filed April 19, 1929

Inventor
Charles H. Dennis
By Frank M. Hough
His Attorney

Patented Apr. 18, 1933

1,904,860

UNITED STATES PATENT OFFICE

CHARLES H. DENNIS, OF JACKSON, MICHIGAN, ASSIGNOR TO THE AMERICAN FORK & HOE COMPANY, OF CLEVELAND, OHIO, A CORPORATION OF OHIO

RAKE

Application filed April 19, 1929. Serial No. 356,366.

My invention relates to rakes and relates particularly to rakes adaptable for such purposes as gardening, separating and collecting articles such as waste paper and the like from cinders, stones and grass, and for the raking of lawns.

An advantage of my invention is to provide a rake of the above character, having a plurality of longitudinally adjustable tines.

Another advantage of my invention is to provide a rake wherein the tines are easily separable from the head of the rake.

Another advantage of my invention is to provide a rake in which any and all of the above advantages may be efficiently realized and which may be inexpensively manufactured.

Other advantages of my invention and the invention itself may become more apparent by the following description of an embodiment of my invention wherein reference is had to the accompanying drawings illustrating the said embodiment.

Figure 1:
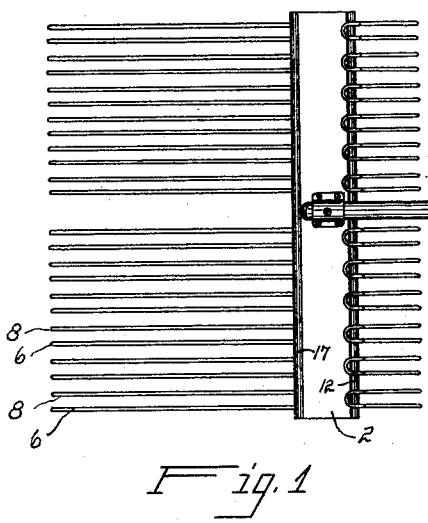
Fig. 1 is a plan view of a rake embodying the principles of my invention, the handle illustrated as having its handle broken away.
Figure 2:
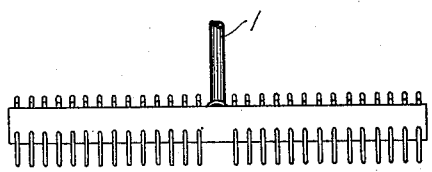
Fig. 2 is an end elevational view of the head end of the rake of Fig. 1.

Referring now to all of the figures of the drawing and all of which like parts are designated by like reference characters, the rake handle carries at its forward end a tine supporting head 2 which is in the form of a sheet metal channel having front and rear flanges forming a front wall 3 and a rear wall 4 and a top wall 5 joining the end walls.

The head is to be made of such a width as to accommodate the desired number of spaced tines such as the tines 6 and 8, which in the embodiment illustrated, are preferably provided in joined pairs, the tines of a pair being integrally secured together by a U-shaped junction 7. The tines are preferably made of round steel wire, although other cross-sectional shapes may obviously be employed. Thus the tine elements, each comprise a pair of tine forks 6 and 8 joined by a U-shaped loop 7 extending forwardly from the rearmost portions 10 of the tines, the loop 7 comprising a pair of parallel arms 9.

The arms 9 are alike deflected in corresponding portions where they join with the loop 7 as shown at 11, to form a retaining humped portion engageable with parallel key portions 12 and 17, extending along the rearward and forward borders of the wall 5 of the channeled head 2. In the particular embodiment illustrated these key portions are formed by pressing outwardly convex ribs in the head.

Figure 4:
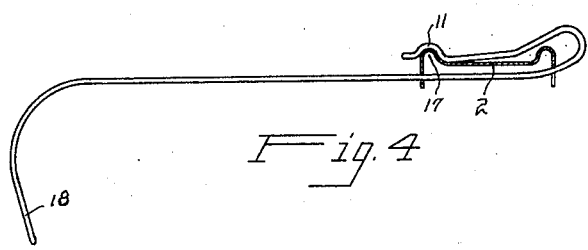
Fig. 4 is a view similar to that of Fig. 3 except that the tine is shown in a different longitudinally adjustable position from that shown in Fig. 3 relative to the head.
Figure 6:
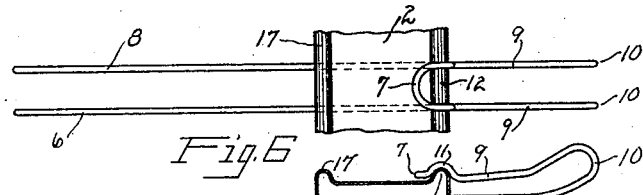
Fig. 6 is a plan view of a fragment of the head and a joined pair of tines secured thereto in the relative position assumed in Fig. 4.
Figure 3:
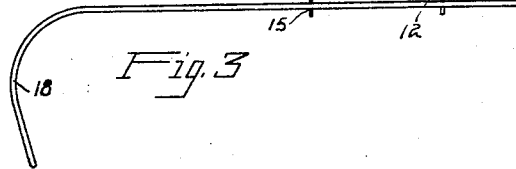
Fig. 3 is a view showing the tine supporting head in longitudinal section and a side view of one of a pair of joined tines secured thereon in side elevation.
Figure 5:
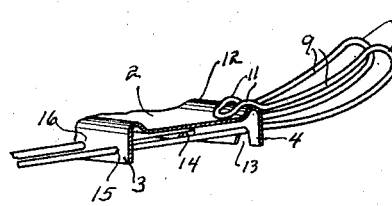
Fig. 5 is a perspective view of a fragment of the head and a fragment of a pair of tines supported on the head.
Figure 9:
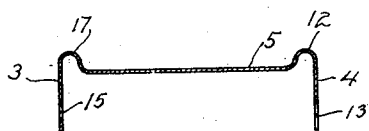
Figs. 7, 8 and 9 are respectively, front, rear and side elevational views of an end fragment of the head upon which the tines are adapted to be adjustably secured.
Figures 7, 8:
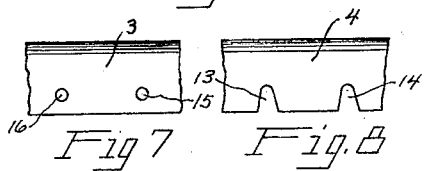

The pairs of joined tines are preferably made of highly resilient steel wire and so formed that the arms 9 tend to take up a position nearer to the tine prongs 6 and 8 than that illustrated, for instance in Figs. 4 and 3.

The tine prongs 6 and 8 project successively through slots 13 and 14 respectively of the channel flange 4 and then through the apertures 15 and 16 respectively in the flange 3 and which are aligned with the said slots.

When so disposed on the head, the humped portion 11 is spring pressed by the resiliency of the looped portions 10, tightly on to the rib projection 12 of the channeled head.

In Fig. 4 a pair of tines such as 6 and 8 joined at 7, are projected more forwardly of the tine supporting head 2, so that the humped portion 11 receives the more forwardly disposed rib 17 of the head channel, being spring pressed thereagainst, as in the case of the rib 12, by the resiliency of the loops 10 having the arms 9.

The rake tines are shiftable in joined pairs from either the position shown in Fig. 3 to the position shown in Fig. 4, or they are removable entirely from the head by drawing them rearwardly from the position assumed in Fig. 3 to withdraw the tines such as 6 and 8 through the slots 13 and 14 respectively and apertures 15 and 16 respectively of the channel flanges.

New tine elements may be substituted for those illustrated, varying if desired, in the curvature given their tips 18 or being of any desired length, which may differ from some purposes from the lengths of tines herein illustrated.

As shown in Fig. 1 the tine elements comprising pairs of tines are all disposed in the rearwardly adjustable position, but some of the tine elements may be adjusted to the forward position illustrated in Fig. 4 and others to the rearward position of Fig. 3. Where greater stiffness of the tine forks is desired, they may all be adjusted to the rearward position illustrated of Fig. 3.

Having thus described my invention, I am aware that numerous and extensive departures may be made from the embodiment here illustrated and described, but without departing from the spirit of my invention.

I claim:

1. In a rake, a handle, a head supported at an end thereof and extending transversely thereto, said head being in the form of a channel having down-turned front and rear flanges, a plurality of tine elements supported by the head, each including a pair of tine forks, projected forwardly therefrom and integrally joined by a forwardly extending loop, said loop and forks resiliently compressively engaging said head to retain the forks in a given longitudinal adjustment thereon.

2. In a rake, a handle, a head supported at an end thereof and extending transversely thereto, said head being in the form of a channel having down-turned front and rear flanges, a plurality of tine elements supported by the head, each including a pair of tine forks, projected forwardly therefrom, each of said forks projected through both flanges, a resilient wire loop overlying the head and comprising a pair of arms extending rearwardly therefrom, said forks being forwardly projected extensions of the rearmost ends of said arms, said loop compressively retaining the element on the head.

3. In a rake, a handle, a head supported at an end thereof and extending transversely thereto, said head comprising a pair of front and rear transversely extending elements, a plurality of tines supported by the head, each projected through both said elements and comprising an integrally formed loop projected rearwardly from the rearmost element, the tine constituting one arm of said loop, a hump portion near the free end of the other arm of the loop, said loop arms resiliently compressively engaging said head therebetween, said loop by its hump portion, to retain the tines thereon.

4. In a rake, a handle, a head supported at an end thereof and extending transversely thereto, said head comprising a pair of front and rear transversely extending elements, a plurality of tines supported by the head, each projected through both said elements and each comprising an integrally formed loop provided with a forwardly extending loop arm, each of said arms and tines resiliently compressively engaging said head to retain the tines thereon, said tines being disposed in pairs integrally joined together by the forwardly extending head engaging arms of their respective loops.

5. In a rake, a handle, a head supported at an end thereof and extending transversely thereto, a plurality of tines each projected through the head and supported thereby and each comprising an integrally formed loop projecting rearwardly from the head, the tine constituting one arm of said loop, a hump portion near the free end of the other arm of the loop, the loop arms resiliently compressively embracing said head therebetween and the said hump portion interlocking with the head to retain the tines against longitudinal shifting on the head.

6. In a rake, a handle, a head supported at an end thereof and extending transversely thereto, a plurality of tines longitudinally slidably supported on the head and each comprising a loop projected rearwardly from the head, the tine constituting one arm of said loop, a hump portion near the free end of the other arm of the loop, said loop arms resiliently compressively engaging said head therebetween, the said hump interlocking therewith, to prevent longitudinal shifting of the tines on the head.

7. In a rake, a handle, a head supported at an end thereof and extending transversely thereto, the head being provided with a pair of spaced substantially parallel key portions extending longitudinally of the head, a plurality of tines longitudinally slidably supported on the head each comprising a loop projecting rearwardly from the head, the tine constituting one arm of said loop, a hump portion near the free end of the other arm of the loop, the loop arms resiliently compressively engaging said head therebetween, the hump portion being adapted to engage one or the other of said key portions optionally to lock the tines on the head in corresponding longitudinally adjusted positions and against longitudinally shifting from said positions.

8. In a rake, a handle, a head supported at an end thereof and extending transversely thereto, the head being provided with a pair of spaced substantially parallel key portions extending longitudinally of the head, a plurality of tines longitudinally slidably supported on the head each tine comprising a loop projecting rearwardly from the head, the tine constituting one arm of said loop, the tines being disposed in pairs joined together at the free ends of the other loop arms, and the said other loop arms being provided each with a hump portion near the free end thereof, the loop arms resiliently compressively engaging said head therebetween and the said hump portions engaging optionally one or the other of said key portions to longitudinally adjustably position the tines on the head and to lock the tines against longitudinally shifting from said positions.

9. In a rake, a handle, a narrow head supported by a mid portion at an end thereof and extending in both directions transversely thereto, said head being so formed of a single piece of sheet metal to provide at least two substantially parallel key portions extending in both lateral directions from the handle, a plurality of tine elements of spring material longitudinally slidably supported on the head, each of said tines comprising a loop providing two arms, a longer one of said arms providing a tine proper extending forwardly from the head, and having a downturned ground engaging portion, the other arm making interchangeable substantially interlocking contact with one or the other of the key portions of said head to adjustably predetermine the length of the tine proper, said key portions restraining longitudinal shifting of the tine on the head.

10. In a rake, a handle, a narrow head supported by a mid portion at an end thereof and extending in both directions transversely thereto, said head being so formed of a single piece of sheet metal to provide at least two substantially parallel key portions extending in both lateral directions from the handle, a plurality of tine elements of spring material longitudinally slidably supported on the head, each of said tines comprising a loop providing two arms, a longer one of said arms providing a tine proper extending forwardly from the head, and having a downturned ground engaging portion, the other arm making interchangeable substantially interlocking contact with one or the other of the key portions of said head to adjustably predetermine the length of the tine proper, said key portions restraining longitudinal shifting of the tine on the head, each of said tine elements being integrally joined at the end of its shorter arm to another of said tine elements, each pair of joined tine elements being removable and insertable with respect to said head as a unit.

11. In a rake, a head therefor of generally channel shape having an intermediate portion formed re-entrant to provide a shoulder portion, a plurality of tine elements supported by the head, each including a pair of tine forks projected forwardly therefrom and integrally joined by forwardly extending loops, said forks being humped at a portion adjacent their looped yoke portion and adapted by said hump portion to compressively engage said shoulder portion.

12. In a rake, a head therefor of generally channel shape having an intermediate portion formed re-entrant to provide a pair of oppositely disposed shoulder portions, a plurality of tine elements supported by the head, each including a pair of tine forks projected forwardly therefrom and integrally joined by forwardly extending loops, said forks being humped at a portion adjacent their looped yoke portion and adapted by said hump portion to lockingly engage either of said shoulder portions.

In testimony whereof I hereunto affix my signature this 21st day of March, 1929.

CHARLES H. DENNIS.